US012784662B2

(12) United States Patent
Huang et al.

(10) Patent No.: US 12,784,662 B2
(45) Date of Patent: Nov. 3, 2026

(54) DISPLAY PANEL WITH PLURALITY OF DISPLAY AREAS WITH FIRST PIXEL UNITS IN A FIRST ACTIVE AREA AND CONNECTED TO FIRST PIXEL CIRCUITS IN A SECOND ACTIVE AREA

(71) Applicant: Yungu (Gu'an) Technology Co., Ltd., Langfang (CN)

(72) Inventors: Shuning Huang, Langfang (CN); Lei Mi, Langfang (CN); Jia Liu, Langfang (CN); Hongrui Li, Langfang (CN)

(73) Assignee: Yungu (Gu'an) Technology Co., Ltd., Langfang (CN)

(*) Notice: Subject to any disclaimer, the term of this patent is extended or adjusted under 35 U.S.C. 154(b) by 0 days.

(21) Appl. No.: 19/219,973

(22) Filed: May 27, 2025

(65) Prior Publication Data

US 2025/0285585 A1 Sep. 11, 2025

Related U.S. Application Data

(63) Continuation of application No. PCT/CN2023/101857, filed on Jun. 21, 2023.

(30) Foreign Application Priority Data

Dec. 1, 2022 (CN) ......................... 202211537308.0

(51) Int. Cl.
*G09G 3/32* (2016.01)
*G09G 3/3233* (2016.01)

(52) U.S. Cl.
CPC ............. *G09G 3/32* (2013.01); *G09G 3/3233* (2013.01); *G09G 2300/0452* (2013.01); *G09G 2320/0233* (2013.01)

(58) Field of Classification Search
None
See application file for complete search history.

(56) References Cited

U.S. PATENT DOCUMENTS 11,727,861 B2 * 8/2023 Wang ....................... G09G 3/32
345/204
11,984,079 B2 * 5/2024 Lu ........................ G09G 3/3233
(Continued)

FOREIGN PATENT DOCUMENTS

CN 210120136 U 2/2020
CN 210245501 U 4/2020
(Continued)

OTHER PUBLICATIONS

International Search Report of Application No. PCT/CN2023/101857.

(Continued)

*Primary Examiner* — Sarvesh J Nadkarni
(74) *Attorney, Agent, or Firm* — Kilpatrick Townsend & Stockton LLP

(57) ABSTRACT

Embodiments of the present application disclose a display panel and a display apparatus. A light transmittance of the first active area of the display panel is greater than a light transmittance of the second active area of the display panel. The display panel includes a plurality of first pixel units located in the first active area and a plurality of first pixel circuits located in the second active area. The first pixel unit includes a plurality of sub-pixels. The first pixel circuit is connected to the first electrode of the corresponding sub-pixel in the first pixel unit through a wire. The first pixel circuits are arranged in an array. The first pixel circuits corresponding to the plurality of sub-pixels in the same first (Continued)

pixel unit are arranged in at least two rows and in a number of columns less than a total number of sub-pixels in the first pixel unit.

17 Claims, 7 Drawing Sheets

(56) References Cited

U.S. PATENT DOCUMENTS

| | | | | |
|---|---|---|---|---|
| 12,004,409 | B2 * | 6/2024 | Tian | H10K 59/82 |
| 12,272,776 | B2 * | 4/2025 | Wu | G09G 3/32 |
| 12,402,479 | B2 * | 8/2025 | Park | H10D 86/423 |
| 12,527,178 | B2 * | 1/2026 | Huang | H10K 59/1213 |
| 2021/0313405 | A1 * | 10/2021 | Xu | H10K 59/131 |
| 2021/0327958 | A1 * | 10/2021 | Li | H10K 59/353 |
| 2022/0069047 | A1 * | 3/2022 | Yang | H10K 59/131 |
| 2022/0293715 | A1 * | 9/2022 | Du | H10K 59/131 |
| 2023/0410736 | A1 * | 12/2023 | Ge | H10K 59/1213 |

FOREIGN PATENT DOCUMENTS

| | | | |
|---|---|---|---|
| CN | 111180494 | A | 5/2020 |
| CN | 111710276 | A | 9/2020 |
| CN | 111916486 | A | 11/2020 |
| CN | 112038373 | A | 12/2020 |
| CN | 113990909 | A | 1/2022 |
| CN | 114566532 | A | 5/2022 |
| CN | 216623636 | U | 5/2022 |
| CN | 114937410 | A | 8/2022 |
| CN | 115224091 | A | 10/2022 |
| CN | 115802838 | A | 3/2023 |

OTHER PUBLICATIONS

Chinese First Office Action Issued in Chinese Patent Application No. 202211537308.0.

* cited by examiner

DISPLAY PANEL WITH PLURALITY OF DISPLAY AREAS WITH FIRST PIXEL UNITS IN A FIRST ACTIVE AREA AND CONNECTED TO FIRST PIXEL CIRCUITS IN A SECOND ACTIVE AREA

CROSS-REFERENCE TO RELATED APPLICATIONS

The present application is a continuation of International Application No. PCT/CN2023/101857 filed on Jun. 21, 2023, which claims priority to Chinese Patent Application No. 202211537308.0, filed with the China National Intellectual Property Administration on Dec. 1, 2022. All of the aforementioned patent applications are hereby incorporated by reference in their entireties.

FIELD

Embodiments of the present application relate to the field of display technologies, and for example, to a display panel and a display apparatus.

BACKGROUND

As display technologies continuously develop, people have increasingly high requirements for a screen-to-body ratio of display apparatuses, and full-screen display technologies have become the mainstream research trend in the future. Currently, an under display camera (UDC) technology has been applied in the display apparatuses. In the technology, a display screen is divided into a primary-screen area and a secondary-screen area. Both the primary-screen area and the secondary-screen area are used for display, and the secondary-screen area is a light-transmissive area in which an under display camera is provided. The secondary-screen area needs to meet both a requirement for a relatively high light transmittance and a requirement for display effects. However, the display apparatuses usually have a problem of poor display effects in secondary-screen areas.

SUMMARY

Embodiments of the present application provide a display panel and a display apparatus, to improve the display effect of a first active area of the display panel and mitigate the problem of display non-uniformity in the first active area.

According to a first aspect, an embodiment of the present application provides a display panel. The display panel has a first active area and a second active area, where a light transmittance of the first active area is greater than a light transmittance of the second active area. The display panel includes:

- a plurality of first pixel units located in the first active area, the first pixel unit including a plurality of sub-pixels, where the sub-pixel includes a first electrode and a second electrode opposite the first electrode; and
- a plurality of first pixel circuits located in the second active area, the first pixel circuit being connected to the first electrode of the corresponding sub-pixel in the first pixel unit through a wire,
- where the plurality of first pixel circuits are arranged in an array, and the first pixel circuits corresponding to the sub-pixels in a same first pixel unit are arranged in at least two rows and in a number of columns less than a total number of sub-pixels in the first pixel unit.

According to a second aspect, an embodiment of the present application provides a display apparatus, including a display panel according to the first aspect.

DETAILED DESCRIPTION OF THE EMBODIMENTS

Display apparatuses have a problem of poor display effects in secondary-screen areas. Through research, it has been found that the reason for the above problem is as follows.

Figure 1:
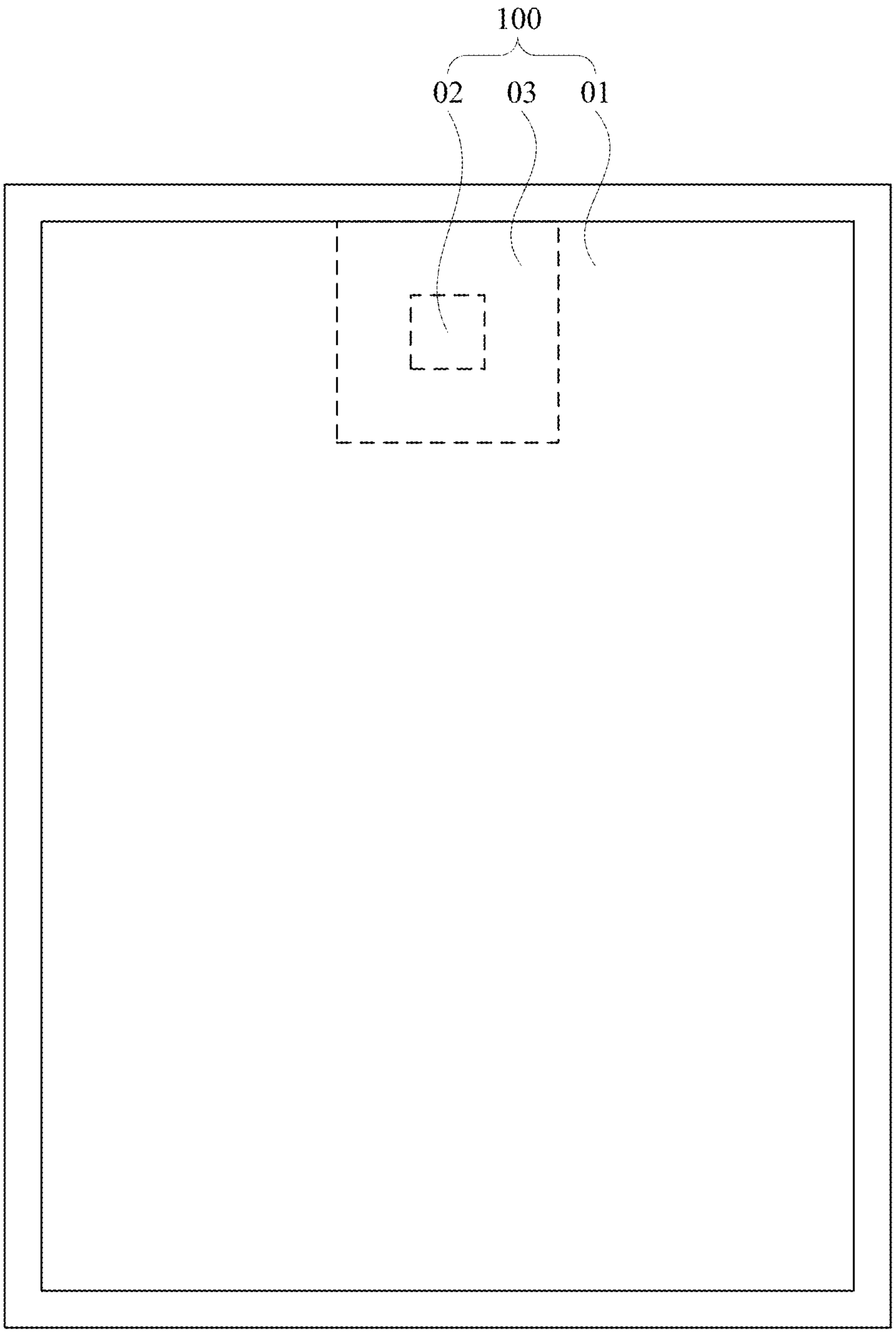
FIG. 1 is a schematic diagram of a structure of a display panel in the related art.

FIG. 1 is a schematic diagram of a structure of a display panel in the related art. Referring to FIG. 1, for example, the display panel includes an active area 100. The active area 100 includes a primary-screen area 01, a secondary-screen area 02, and a transition area 03 located between the primary-screen area 01 and the secondary-screen area 02. The primary-screen area 01, the secondary-screen area 02, and the transition area 03 each include a plurality of sub-pixels to achieve a display function, and the secondary-screen area 02 is a light-transmissive area in which an under display camera is provided. The secondary-screen area 02 needs to meet a requirement for relatively high light transmittance to achieve a relatively low diffraction effect, and also needs to meet a requirement for display effects. Therefore, pixel circuits that drive the sub-pixels of the secondary-screen area 02 need to be arranged in the transition area 03 around the secondary-screen area 02, to improve the light transmittance of the secondary-screen area 02 and reduce the diffraction effect of the secondary-screen area 02. However, the transition area 03 is usually a relatively large area, which makes connection lines between the pixel circuits in the transition area 03 and the sub-pixels in the secondary-screen area 02 excessively long, resulting in relatively large parasitic capacitances in the connection lines and slow charging rates at anodes of light-emitting devices of the sub-pixels in the secondary-screen area 02, and thus affecting the display effect in the secondary-screen area 02. Moreover, the connection lines between the sub-pixels at different positions in the secondary-screen area 02 and the corresponding pixel circuits in the transition area 03 have different lengths, which makes different parasitic capacitances in different connection lines and also different charging rates at anodes of light-emitting devices of different sub-pixels, resulting in the problem of display non-uniformity easily occurring in the secondary-screen area 02 at a low gray level.

Figure 2:
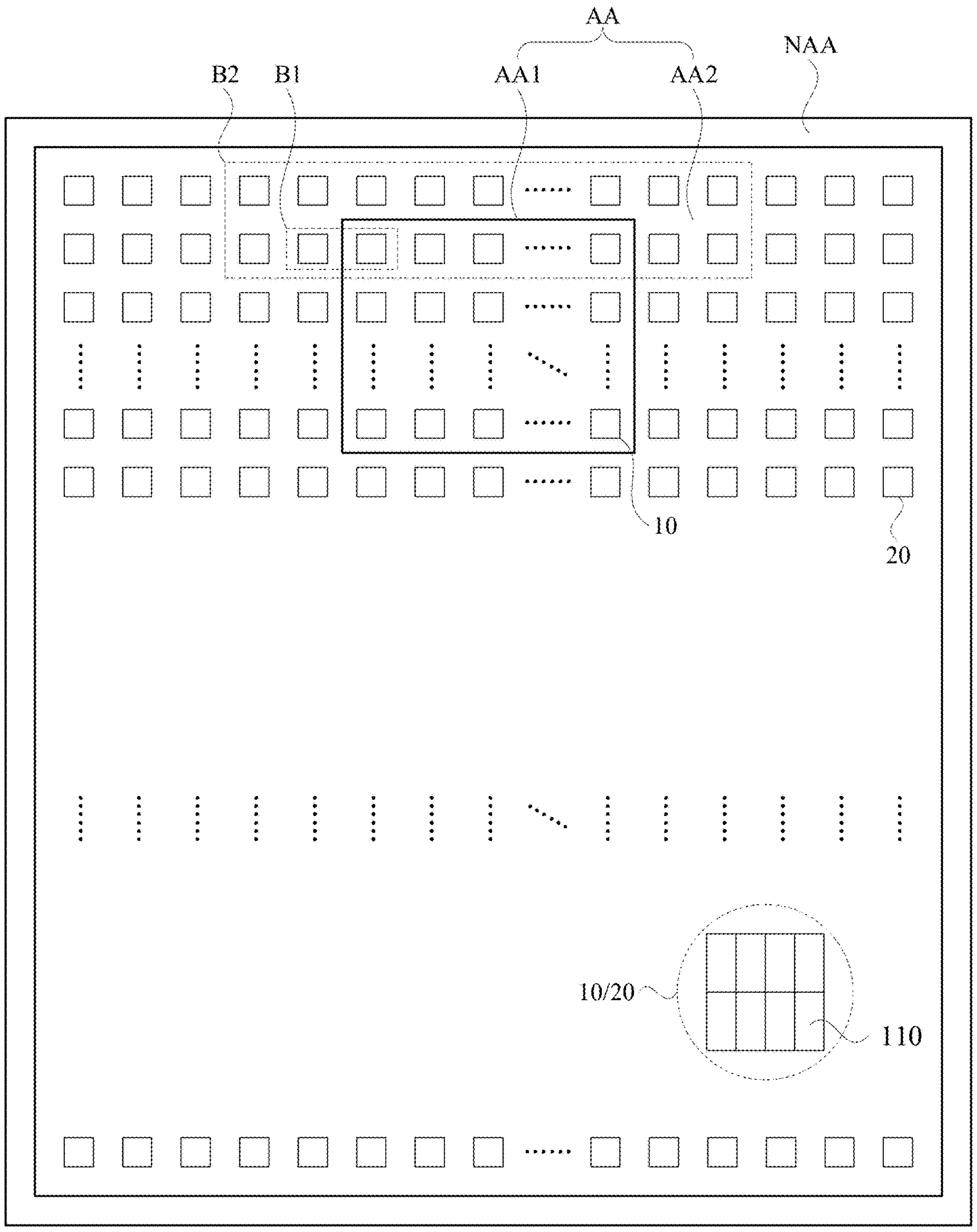
FIG. 2 is a schematic diagram of a structure of a display panel according to an embodiment of the present application.
Figure 3:
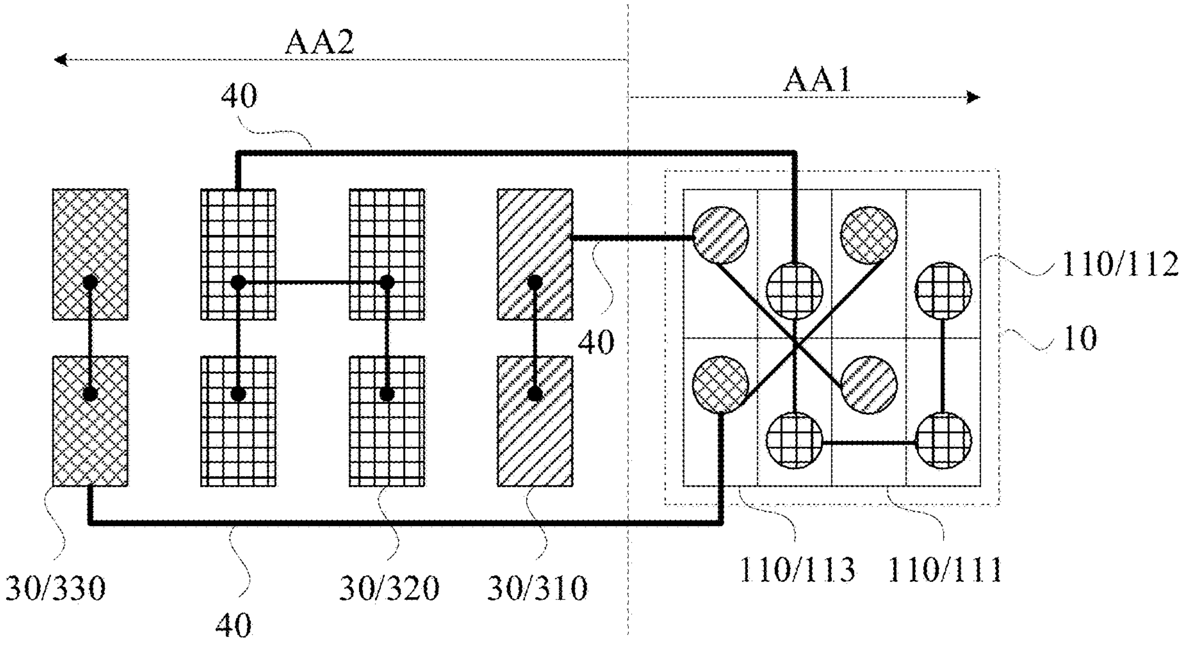
FIG. 3 is a partial enlarged view of an area B1 in FIG. 2.

Embodiments of the present application provide a display panel. FIG. 2 is a schematic diagram of a structure of a display panel according to an embodiment of the present application. FIG. 3 is a partial enlarged view of an area B1 in FIG. 2. Referring to FIG. 2 and FIG. 3, the display panel has an active area AA and a non-active area NAA. The active area AA includes a first active area AA1 and a second active area AA2, where a light transmittance of the first active area AA1 is greater than a light transmittance of the second active area AA2. The display panel includes a plurality of first pixel units 10 and a plurality of first pixel circuits 30. The first pixel units 10 are located in the first active area AA1. The first pixel unit 10 includes a plurality of sub-pixels 110. The sub-pixel 110 includes a first electrode and a second electrode opposite the first electrode. The first pixel circuits 30 are located in the second active area AA2. The first pixel circuit 30 is connected to the first electrode of the corresponding sub-pixel 110 in the first pixel unit 10 through a wire 40.

The plurality of first pixel circuits 30 are arranged in an array. The first pixel circuits 30 corresponding to the plurality of sub-pixels 110 in the same first pixel unit 10 are arranged in at least two rows and in a number of columns less than a total number of sub-pixels 110 in the first pixel unit 10.

For example, the display panel according to the embodiment of the present application may be an organic light-emitting diode (OLED) display panel, an active-matrix organic light-emitting diode (AMOLED) display panel, a micro light-emitting diode (micro-LED) display panel, etc. The first active area AA1 includes a plurality of first pixel units 10. The second active area AA2 includes a plurality of second pixel units 20. The first pixel unit 10 and the second pixel unit 20 each include a plurality of sub-pixels 110. The sub-pixel 110 may include a light-emitting device, such as an OLED or a micro LED. In a possible case, the first electrode of the sub-pixel may be an anode of the light-emitting device, and the second electrode of the sub-pixel may be a cathode of the light-emitting device. In other possible cases, the first electrode of the sub-pixel may be the cathode of the light-emitting device, and the second electrode of the sub-pixel may be the anode of the light-emitting device.

The first pixel circuits 30 are configured to drive the corresponding sub-pixels 110 in the first pixel unit 10 to emit light. The display panel further includes a plurality of second pixel circuits (not shown in FIG. 2 and FIG. 3). The second pixel circuits are located in the second active area AA2, and are configured to drive the corresponding sub-pixels 110 in the second pixel unit 20 to emit light. The sub-pixels 110 in the first active area AA1 are driven by the first pixel circuits 30 to emit light, and the corresponding sub-pixels 110 in the second active area AA2 are driven by the second pixel circuits to emit light, such that the display panel can implement a display function. The second active area AA2 may be a normal active area, which is also referred to as a primary-screen area. The first active area AA1 may be a transparent active area, which is also referred to as a secondary-screen area. The display panel has an active side and a non-active side opposite the active side. On the non-active side corresponding to the first active area AA1, a photosensitive element may be arranged. For example, the photosensitive element may be an under display camera. In a display mode, both the first active area AA1 and the second active area AA2 display light normally. In a photographing mode, the first active area AA1 has a relatively high light transmittance, which enables light to pass through the first active area AA1 into the under display camera, such that the under display camera can sense light and then perform photographing.

The first pixel circuit 30 includes a driving current output terminal. The driving current output terminal of the first pixel circuit 30 may be connected to the anode of the light-emitting device of the corresponding sub-pixel 110 through the wire 40, to supply a driving current to the anode of the light-emitting device to drive the light-emitting device to emit light. A plurality of sub-pixels 110 in the same first pixel unit 10 may correspond to a plurality of first pixel circuits 30. Configuring the first pixel circuits 30 corresponding to the plurality of sub-pixels 110 in the same first pixel unit 10 to be arranged in at least two rows and in a number of columns less than the total number of sub-pixels 110 in the first pixel unit 10 enables at least a portion of the first pixel circuits 30 to be arranged in the same column to reduce the number of columns in which the plurality of first pixel circuits 30 are arranged, so as to reduce widths of the plurality of first pixel circuits 30 in a row direction in which the plurality of first pixel circuits are arranged, reduce distances between the first pixel circuits 30 and the sub-pixels 110 and then reduce lengths of the wires 40 connected between the first pixel circuits 30 and the sub-pixels 110. Reducing the lengths of the wires 40 facilitates reducing the parasitic capacitances in the wires 40, to increase charging rates of the first pixel circuits 30 for the anodes of the light-emitting devices of the sub-pixels 110, thereby ensuring the display effect in the first active area AA1. Since the lengths of all of the wires 40 between the plurality of sub-pixels 110 in the first active area AA1 and the corresponding first pixel circuits 30 are reduced, the embodiment facilitates reducing the difference in lengths between the wires 40 connected to the plurality of sub-pixels 110 to reduce the difference in charging rates between the anodes of the light-emitting devices of the plurality of sub-pixels 110. Therefore, the problem of display non-uniformity in the first active area AA1 is mitigated.

For example, when the first pixel unit 10 includes eight sub-pixels 110 and the eight sub-pixels 110 correspond to a total of eight first pixel circuits 30, the corresponding eight first pixel circuits 30 may be configured to be arranged in at least two rows and in less than eight columns. For example, the eight first pixel circuits 30 may be configured to be arranged in two rows and four columns. Compared with the solution in which the eight first pixel circuits 30 are arranged in one row and eight columns, in the embodiment, the number of columns in which the plurality of first pixel circuits 30 are arranged is reduced, so that the lengths of the wires 40 between at least a portion of the first pixel circuits 30 and the corresponding sub-pixels 110 can be reduced, to reduce the parasitic capacitances in the wires 40 and improve charging rates of the first pixel circuits 30 for the anodes of the light-emitting devices of the sub-pixels 110, thereby ensuring the display effect in the first active area AA1. In addition, this further facilitates reducing the difference in lengths between the wires 40 connected to the plurality of sub-pixels 110. Therefore, the problem of display non-uniformity in the first active area AA1 is mitigated.

To sum up, in the embodiment of the present application, the first pixel circuits corresponding to the plurality of sub-pixels in the same first pixel unit are configured to be arranged in at least two rows and in a number of columns less than the total number of sub-pixels in the first pixel unit. This facilitates reducing the number of columns in which the plurality of first pixel circuits are arranged, to reduce distances between the first pixel circuits and the sub-pixels, and then reduce lengths of wires connected between the first pixel circuits and the sub-pixels, thereby improving charging rates of the first pixel circuits for the sub-pixels. Therefore, the display effect in the first active area is ensured. In addition, since the lengths of all of the wires connected to the plurality of sub-pixels in the first active area are reduced, the embodiments of the present application further facilitate reducing the difference in lengths between the wires connected to the plurality of sub-pixels, to reduce the difference in charging rates between the plurality of sub-pixels. Therefore, the problem of display non-uniformity in the first active area is mitigated.

It should be noted that FIG. 3 only shows that the first pixel circuits 30 corresponding to the plurality of sub-pixels 110 in the same first pixel unit 10 are arranged in two rows. In other embodiments, the first pixel circuits 30 corresponding to the plurality of sub-pixels 110 in the same first pixel unit 10 may alternatively be arranged in more than two rows, to further reduce the number of columns in which the plurality of first pixel circuits 30 are arranged, thereby reducing lengths of the wires 40 between the first pixel circuits 30 and the corresponding sub-pixels 110.

Referring to FIG. 2 and FIG. 3, on the basis of the above embodiments, the first pixel unit 10 may be configured to include m sub-pixels 110 of the same color, and the m sub-pixels 110 of the same color in the same first pixel unit 10 are driven by n first pixel circuits 30, where n and m are both positive integers greater than or equal to 1, and n≤m. For example, for n=m=1, one first pixel circuit 30 can drive one sub-pixel 110 in the first pixel unit 10, enabling one driving one. For n=1 and m>1, one first pixel circuit 30 can drive a plurality of sub-pixels 110 of the same color in the first pixel unit 10, enabling one driving many. For n>1 and m>1, a plurality of first pixel circuits 30 can drive a plurality of sub-pixels 110 of the same color in the first pixel unit 10, enabling many driving many.

In one embodiment, for n=m=1, each first pixel circuit 30 is connected to one corresponding sub-pixel 110 through a wire 40. For n=1 and m>1, the first electrodes of the m sub-pixels 110 of the same color in the same first pixel unit 10 are electrically connected to each other, and are electrically connected to the corresponding first pixel circuits 30 through the same wire 40. For n>1 and m>1, n first pixel circuits 30 corresponding to the m sub-pixels 110 of the same color in the same first pixel unit 10 are electrically connected to each other, and the first electrodes of the m sub-pixels 110 of the same color are electrically connected to each other, and are electrically connected to any one first pixel circuit 30 among the n corresponding first pixel circuits 30 through the same wire 40.

For example, the sub-pixel 110 includes a light-emitting device. The wire 40 is connected between a driving current output terminal of the first pixel circuit 30 and the first electrode (for example) of the light-emitting device in the corresponding sub-pixel 110. For n=m=1, the driving current output terminal of each first pixel circuit 30 is connected to the first electrode of the light-emitting device in one corresponding sub-pixel 110 through the wire 40. For n=1 and m>1, the first electrodes of the light-emitting devices in the m sub-pixels 110 of the same color in the same first pixel unit 10 are electrically connected to each other, and are connected to the driving current output terminal of one corresponding first pixel circuit 30 through the same wire 40. For n>1 and m>1, the driving current output terminals of the n first pixel circuits 30 corresponding to the m sub-pixels 110 of the same color in the same first pixel unit 10 are electrically connected to each other, and the first electrodes of the m sub-pixels 110 of the same color are electrically connected to each other, and are electrically connected to the driving current output terminal of any first pixel circuit 30 among the n corresponding first pixel circuits 30 through the same wire 40. In one embodiment, for n>1 and m>1, the m sub-pixels 110 of the same color in the same first pixel unit 10 are connected to the closest first pixel circuit 30 among the n corresponding first pixel circuits 30 through the wire 40. Such a configuration has an advantage of reducing the length of the wire 40 to reduce the parasitic capacitance in the wire 40, so as to increase the charging rates of the first pixel circuits 30 for the anodes of the light-emitting devices of the sub-pixels 110, thereby improving the display effect in the first active area AA1.

In one embodiment, the plurality of sub-pixels 110 in the first pixel unit 10 have different colors, and there is at least one sub-pixel 110 of each color. In an embodiment, the first pixel circuits 30 corresponding to the sub-pixels 110 of the same color in the same first pixel unit 10 may be configured to be arranged in the same column.

For example, the first pixel unit 10 includes a first sub-pixel 111, a second sub-pixel 112, and a third sub-pixel 113. The first sub-pixel 111, the second sub-pixel 112, and the third sub-pixel 113 have different colors. The first pixel circuit 30 includes a first sub-pixel circuit 310, a second sub-pixel circuit 320, and a third sub-pixel circuit 330. The first sub-pixel circuit 310 is configured to drive the first sub-pixel 111, the second sub-pixel circuit 320 is configured to drive the second sub-pixel 112, and the third sub-pixel circuit 330 is configured to drive the third sub-pixel 113. The first sub-pixel circuits 310 corresponding to the sub-pixels 110 of the same color in the same first pixel unit 10 may be arranged in the same column, the second sub-pixel circuits 320 corresponding to the sub-pixels 110 of the same color in the same first pixel unit 10 may be arranged in the same column, and the third sub-pixel circuits 330 corresponding to the sub-pixels 110 of the same color in the same first pixel unit 10 may also be arranged in the same column. Such a configuration has an advantage of reducing the number of columns in which the first pixel circuits 30 are arranged, to reduce the widths of the first pixel circuits 30 in the row direction in which the first pixel circuits are arranged, reduce the distances between the first pixel circuits 30 and the sub-pixels 110, and then reduce the lengths of the wires 40 connected between the first pixel circuits 30 and the sub-pixels 110. Moreover, arranging the first pixel circuits 30 corresponding to the sub-pixels 110 of the same color in the same column further facilitates simplifying the layout of connection lines between the first pixel circuits 30 corresponding to the sub-pixels 110 of the same color.

In other embodiments, the first pixel circuits 30 corresponding to the sub-pixels 110 of the same color in the same first pixel unit 10 may alternatively be configured to be arranged in the same row. For example, the first sub-pixel circuits 310 corresponding to the sub-pixels 110 of the same color in the same first pixel unit 10 may be arranged in the same row, the second sub-pixel circuits 320 corresponding to the sub-pixels 110 of the same color in the same first pixel unit 10 may be arranged in the same row, the third sub-pixel circuits 330 corresponding to the sub-pixels 110 of the same color in the same first pixel unit 10 may be arranged in the same row, and the first pixel circuits 30 corresponding to sub-pixels 110 of different colors may be arranged in the same or different rows. Such a configuration has an advantage of simplifying the layout of the connection lines between the first pixel circuits 30 corresponding to the sub-pixels 110 of the same color.

Referring to FIG. 3, in one embodiment, the same first pixel unit 10 includes two first sub-pixels 111 and two third sub-pixels 113, as well as four second sub-pixels 112. The first sub-pixel 111, the second sub-pixel 112, and the third sub-pixel 113 are arranged in an array in the first pixel unit 10. The first sub-pixel 111, the second sub-pixel 112, the third sub-pixel 113, and the second sub-pixel 112 are sequentially arranged in a first row of the first pixel unit 10, and the third sub-pixel 113, the second sub-pixel 112, the first sub-pixel 111, and the second sub-pixel 112 are sequentially arranged in a second row of the first pixel unit 10. In one embodiment, the first sub-pixel 111 is a red sub-pixel 110, the second sub-pixel 112 is a green sub-pixel 110, and the third sub-pixel 113 is a blue sub-pixel 110.

In one embodiment, the two first sub-pixels 111 in the same first pixel unit 10 may be configured to be driven by two first sub-pixel circuits 310, the two third sub-pixels 113 in the same first pixel unit 10 may be configured to be driven by two third sub-pixel circuits 330, and the four second sub-pixels 112 in the same first pixel unit 10 may be configured to be driven by four second sub-pixel circuits 320. In the first pixel circuits 30 corresponding to the same first pixel unit 10: two first sub-pixel circuits 310 are arranged in the same column, two third sub-pixel circuits 330 are arranged in the same column, four second sub-pixel circuits 320 are arranged in two columns, and two first sub-pixel circuits 310, four second sub-pixel circuits 320, and two third sub-pixel circuits 330 are arranged in at least two rows.

For example, the first sub-pixel circuit 310, the second sub-pixel circuit 320, and the third sub-pixel circuit 330 corresponding to the plurality of sub-pixels in the same first pixel unit 10 may be arranged in two rows, where each row includes the first sub-pixel circuit 310, the second sub-pixel circuit 320, and the third sub-pixel circuit 330, and the first pixel circuits 30 for driving the sub-pixels of the same color are located in the same column. Such a configuration has an advantage of reducing the number of columns in which the first pixel circuits 30 are arranged, to reduce the widths of the first pixel circuits 30 in the row direction in which the first pixel circuits are arranged, reduce the distances between the first pixel circuits 30 and the sub-pixels 110, and then reduce the lengths of the wires 40 connected between the first pixel circuits 30 and the sub-pixels 110. Moreover, arranging the first pixel circuits 30 corresponding to the sub-pixels 110 of the same color in the same column further facilitates simplifying the layout of connection lines between the first pixel circuits 30 corresponding to the sub-pixels 110 of the same color.

Still referring to FIG. 3, one column of first sub-pixel circuits 310, two columns of second sub-pixel circuits 320, and one column of third sub-pixel circuits 330 are sequentially arranged on one side of the corresponding first pixel unit 10. This facilitates reducing the distance between the first sub-pixel circuit 310 and the first sub-pixel 111 to reduce the length of the wire 40 between the first sub-pixel circuit 310 and the first sub-pixel 111, and facilitates reducing the distance between the second sub-pixel circuit 320 and the second sub-pixel 112 to reduce the length of the wire 40 between the second sub-pixel circuit 320 and the second sub-pixel 112.

In other embodiments, one column of first sub-pixel circuits 310, one column of third sub-pixel circuits 330, and two columns of second sub-pixel circuits 320 may alternatively be configured to be sequentially arranged on one side of the corresponding first pixel unit 10. This facilitates reducing the distance between the first sub-pixel circuit 310 and the first sub-pixel 111 to reduce the length of the wire 40 between the first sub-pixel circuit 310 and the first sub-pixel 111, and facilitates reducing the distance between the third sub-pixel circuit 330 and the third sub-pixel 113 to reduce the length of the wire 40 between the third sub-pixel circuit 330 and the third sub-pixel 113.

Figure 4:
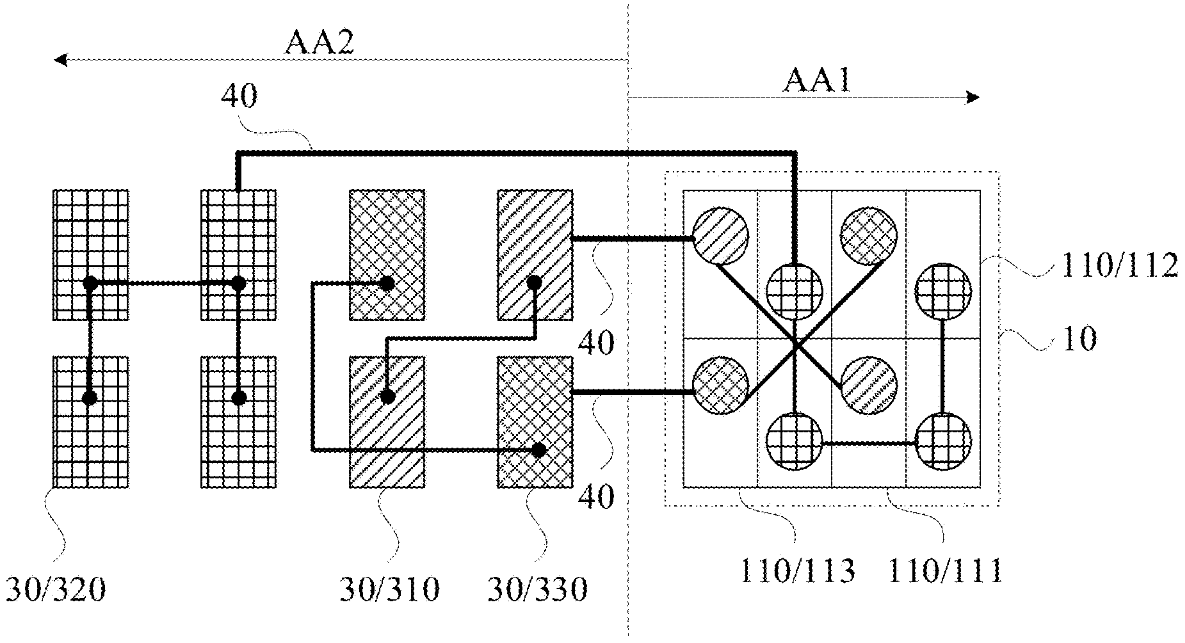
FIG. 4 is another partial enlarged view of the area B1 in FIG. 2.

FIG. 4 is another partial enlarged view of the area B1 in FIG. 2. Referring to FIG. 4, in another embodiment, the first pixel circuits 30 corresponding to the sub-pixels 110 of the same color in the same first pixel unit 10 may be configured to be arranged in different rows and/or different columns. For example, the first pixel circuits 30 corresponding to sub-pixels 110 of different colors in the same first pixel unit 10 may be arranged in the same row or column, such that the first pixel circuits 30 corresponding to the sub-pixels 110 of the same color are arranged in different rows and/or different columns. Therefore, the flexibility in arranging the first pixel circuits 30 is improved.

Still referring to FIG. 4, in the first pixel circuits 30 corresponding to the same first pixel unit 10: one first sub-pixel circuit 310 and one third sub-pixel circuit 330 are arranged in the same column, the other first sub-pixel circuit 310 and the other third sub-pixel circuit 330 are arranged in the same column, four second sub-pixel circuits 320 are arranged in two columns, and two first sub-pixel circuits 310, four second sub-pixel circuits 320, and two third sub-pixel circuits 330 are arranged in at least two rows. In one embodiment, two columns of first sub-pixel circuits 310, two columns of third sub-pixel circuits 330, and two columns of second sub-pixel circuits 320 are sequentially arranged on one side of the corresponding first pixel unit 10.

For example, the first pixel circuits 30 corresponding to the same first pixel unit 10 are arranged on one side of the first pixel unit 10, and arranged in two rows and four columns. For example, from the side of the second active area AA2 that is close to the first active area AA1, the first pixel circuit 30 in the first row sequentially includes the first sub-pixel circuit 310, the third sub-pixel circuit 330, the second sub-pixel circuit 320, and the second sub-pixel circuit 320, and the first pixel circuit 30 in the second row sequentially includes the third sub-pixel circuit 330, the first sub-pixel circuit 310, the second sub-pixel circuit 320, and the second sub-pixel circuit 320. This facilitates reducing the distance between the first sub-pixel circuit 310 in the first row and the first sub-pixel 111 and the distance between the third sub-pixel circuit 330 in the second row and the third sub-pixel 113. Configuring the first sub-pixel circuit 310 in the first row to be connected to the first sub-pixel 111 in the first row in the first pixel unit 10 through the wire 40 facilitates reducing the length of the wire 40 between the first sub-pixel circuit 310 and the first sub-pixel 111. Configuring the third sub-pixel circuit 330 in the second row to be connected to the third sub-pixel 113 in the second row in the first pixel unit 10 through the wire 40 facilitates reducing the length of the wire 40 between the third sub-pixel circuit 330 and the third sub-pixel 113. In addition, configuring the second sub-pixel circuit 320 closest to the second sub-pixel 112 to be connected to the second sub-pixel 112 through the wire 40 further facilitates reducing the length of the wire 40 between the second sub-pixel circuit 320 and the second sub-pixel 112.

On the basis of the above embodiments, the first pixel circuits 30 corresponding to the plurality of sub-pixels 110 in the same first pixel unit 10 are arranged in at least two adjacent rows. Such a configuration has an advantage of reducing the number of rows in which the first pixel circuits 30 corresponding to the sub-pixels 110 in the same first pixel unit 10 are arranged, so as to reduce the widths of the first pixel circuits 30 in a column direction in which the first pixel circuits are arranged, reduce the distances between the first pixel circuits 30 and the sub-pixels 110, and then reduce the lengths of the wires 40 connected between the first pixel circuits 30 and the sub-pixels 110.

Referring to FIG. 2 to FIG. 4, on the basis of the above embodiments, the wire 40 may be a transparent metal wire. For example, a material of the wire 40 may include indium tin oxide (ITO) and/or indium zinc oxide (IZO). Since the first active area AA1 has relatively high light transmittance, the wire 40 is configured as the transparent metal wire to prevent the wire 40 from affecting the light transmittance of the first active area AA1. The wire 40 is located in an area between adjacent second pixel units 20 or an area between a first pixel unit 10 and a second pixel unit 20 that are adjacent to each other, and the wire 40 is insulated from the first pixel circuit 30 and/or the second pixel circuit 50 to which the wire is not connected, to avoid affecting the display effect of the second pixel unit 20 in the second active area AA2.

For example, the display panel includes a substrate, and an array circuit layer and a first metal layer which are sequentially located on one side of the substrate. The first pixel circuit 30 and the second pixel circuit 50 are both formed in the array circuit layer. The wire 40 may be arranged in the first metal layer, to avoid affecting the display effect of the sub-pixels 110 in the first pixel unit 10 as a result of the wire 40 overlapping a signal line connected to the first pixel circuit 30 and/or the second pixel circuit 50.

Figure 5:
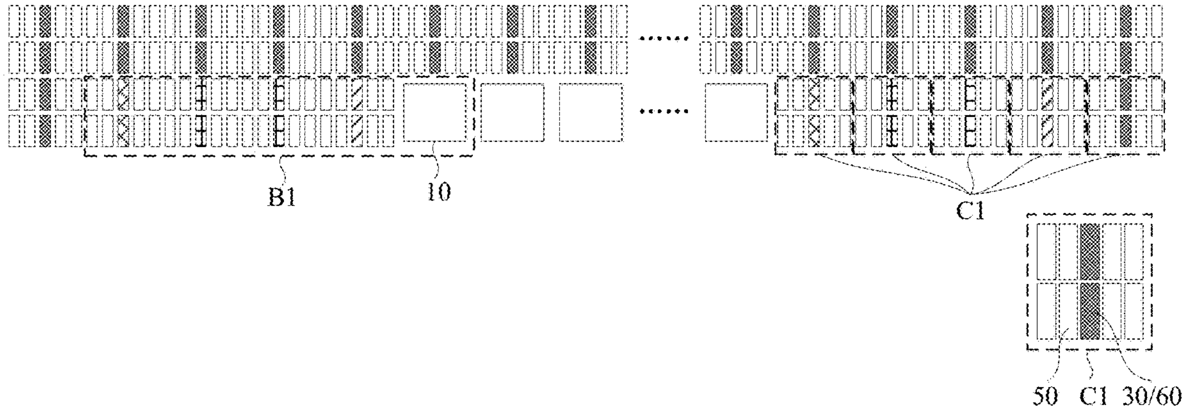
FIG. 5 is a partial enlarged view of an area B2 in FIG. 2.

FIG. 5 is a partial enlarged view of an area B2 in FIG. 2. FIG. 5 shows a first row of first pixel units 10 in the first active area AA1 and first four rows of pixel circuits (including the first pixel circuit 30 and the second pixel circuit 50) located in the area B2 in the second active area AA2. The first pixel circuits 30 in FIG. 5 may be arranged in the same way as the first pixel circuits 30 in FIG. 3. Referring to FIG. 2, FIG. 3, and FIG. 5, in one embodiment, the first active area AA1 includes at least one row of first pixel units 10, and first pixel circuits 30 corresponding to the sub-pixels 110 in the same row of first pixel units 10 occupy the same row.

For example, a description is made by using the first row of first pixel units 10 in the first active area AA1 as an example. When the first pixel unit 10 includes two rows of sub-pixels 110, the first pixel circuits 30 corresponding to the plurality of sub-pixels 110 in the same first pixel unit 10 may be arranged in two rows, for example, in a third row of pixel circuits and a fourth row of pixel circuits, and the first pixel circuits 30 corresponding to the sub-pixels 110 in the first row of first pixel units 10 are all located in the third row of pixel circuits and the fourth row of pixel circuits. Such a configuration has an advantage of connecting the first pixel circuits 30 for driving the sub-pixels 110 in the same row of first pixel units 10 to the same scan line, which, compared with the solution in which the first pixel circuits 30 for driving the sub-pixels 110 in the same row of first pixel units 10 are distributed in different rows, eliminates the need for complex wire winding when connecting the first pixel circuits 30 through the scan line, thereby simplifying the structure of the scan line and avoiding mismatched writing of a scan signal.

Referring to FIG. 2, FIG. 3, and FIG. 5, in one embodiment, the first pixel circuits 30 corresponding to the sub-pixels 110 in the same row of first pixel units 10 are distributed on two sides of the row of first pixel units 10. For example, the first pixel circuits 30 corresponding to the sub-pixels 110 in one portion of the first pixel units 10 in the same row may be distributed on one side of the row of first pixel units 10, and the first pixel circuits 30 corresponding to the sub-pixels 110 in the other portion of the first pixel units 10 in the same row may be distributed on the other side of the row of first pixel units 10. For example, when there are eight first pixel units 10 in each row, the first pixel circuits 30 corresponding to the first to fourth first pixel units 10 in the first row may all be arranged on a left side of the row of first pixel units 10, with the first pixel circuits 30 corresponding to the first to fourth first pixel units 10 in the first row being sequentially arranged on the left side of the row of first pixel units 10, and the first pixel circuits 30 corresponding to the fifth to eighth first pixel units 10 in the first row may all be arranged on a right side of the row of first pixel units 10, with the first pixel circuits 30 corresponding to the fifth to eighth first pixel units 10 in the first row being sequentially arranged on the right side of the row of first pixel units 10. Such a configuration has an advantage of arranging the first pixel circuits 30 corresponding to the sub-pixels 110 in the first pixel units 10 on the side adjacent to the first pixel units 10, so as to reduce the lengths of the wires 40 connected between the first pixel circuits 30 and the sub-pixels 110.

Figure 6:
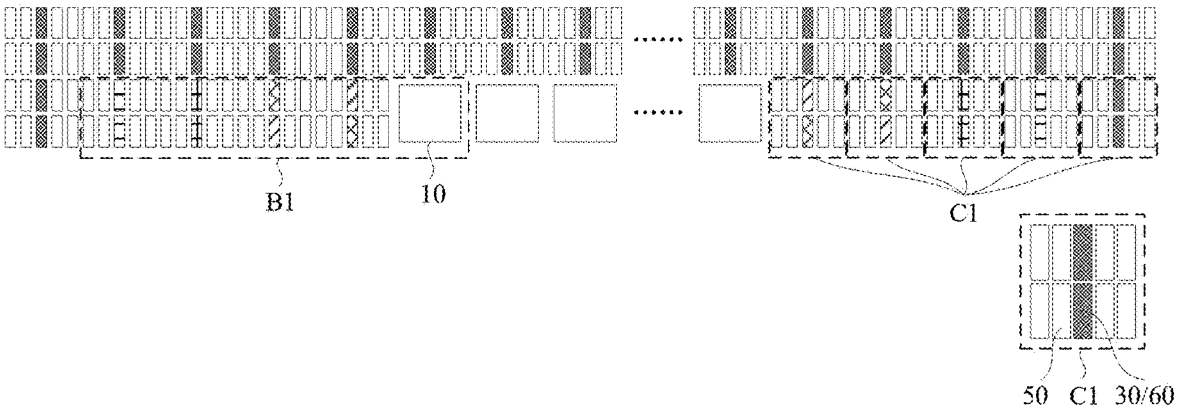
FIG. 6 is another partial enlarged view of the area B2 in FIG. 2.

FIG. 6 is another partial enlarged view of the area B2 in FIG. 2. The first pixel circuits 30 in FIG. 6 may be arranged in the same way as the first pixel circuits 30 in FIG. 4. Referring to FIG. 2, FIG. 4, and FIG. 6, in this embodiment, the first pixel circuits 30 corresponding to the sub-pixels 110 in the same row of first pixel units 10 may be configured to occupy the same row, and the first pixel circuits 30 corresponding to the sub-pixels 110 in the same row of first pixel units 10 are distributed on two sides of the row of first pixel units 10.

Referring to FIG. 2 to FIG. 6, in one embodiment, in an embodiment, at least a portion of the first pixel circuits 30 may be located between adjacent second pixel circuits 50. For example, a portion of the first pixel circuits 30 may be configured to be located between adjacent second pixel circuits 50, or all of the first pixel circuits 30 may be configured to be located between adjacent second pixel circuits 50, i.e., each first pixel circuit 30 is located between adjacent second pixel circuits 50. Such a configuration has an advantage of arranging the first pixel circuits 30 in the area between adjacent second pixel circuits 50, without the need to arrange a transition area between the first active area AA1 and the second active area AA2 to store the first pixel circuits 30 alone.

In one embodiment, the display panel further includes dummy pixel circuits 60 located between adjacent second pixel circuits 50, and at least a portion of the dummy pixel circuits 60 are reused as the first pixel circuit 30. For example, a plurality of dummy pixel circuits 60 are generally arranged between adjacent second pixel circuits 50 in the display panel. The dummy pixel circuits 60 have the same structure as the second pixel circuits 50, except that the dummy pixel circuits 60 are generally not connected to the sub-pixels 110 and are not configured to drive the sub-pixels 110 to emit light. In the embodiment, at least a portion of the dummy pixel circuits 60 may be reused as the first pixel circuit 30, such that driving current output terminals of the dummy pixel circuits 60 are connected to the corresponding sub-pixels 110 through the wires 40 to drive the corresponding sub-pixels 110 to emit light. In this way, there is no need to additionally arrange the first pixel circuits 30 in the display panel to drive the sub-pixels 110, to avoid additional occupation of the space of the display panel by the first pixel circuits 30. In addition, reusing the dummy pixel circuits 60 as the first pixel circuit 30 makes the structure of the first pixel circuit 30 consistent with that of the second pixel circuit 50, which facilitates improving the display consistency between the first active area AA1 and the second active area AA2.

For example, the second active area AA2 includes a plurality of pixel circuit units C1 arranged in an array. Each pixel circuit unit C1 includes second pixel circuits 50 and dummy pixel circuits 60 located between adjacent second pixel circuits 50. For example, each pixel circuit unit C1 includes two rows of pixel circuits, and each row of pixel circuits sequentially includes two second pixel circuits 50, one dummy pixel circuit 60, and two second pixel circuits 50. The eight second pixel circuits 50 in each pixel circuit unit C1 are respectively configured to drive sub-pixels 110 of different colors to emit light. At least a portion of the dummy pixel circuits 60 in the pixel circuit unit C1 may be reused as the first pixel circuit 30. FIG. 5 and FIG. 6 both show that the dummy pixel circuits 60 in the eight pixel circuit units C1 on two sides of the first row of first pixel units 10 are all reused as the first pixel circuit 30. For example, the dummy pixel circuits 60 may be respectively reused as the first sub-pixel circuit 310, the second sub-pixel circuit 320, and the third sub-pixel circuit 330.

Figure 7:
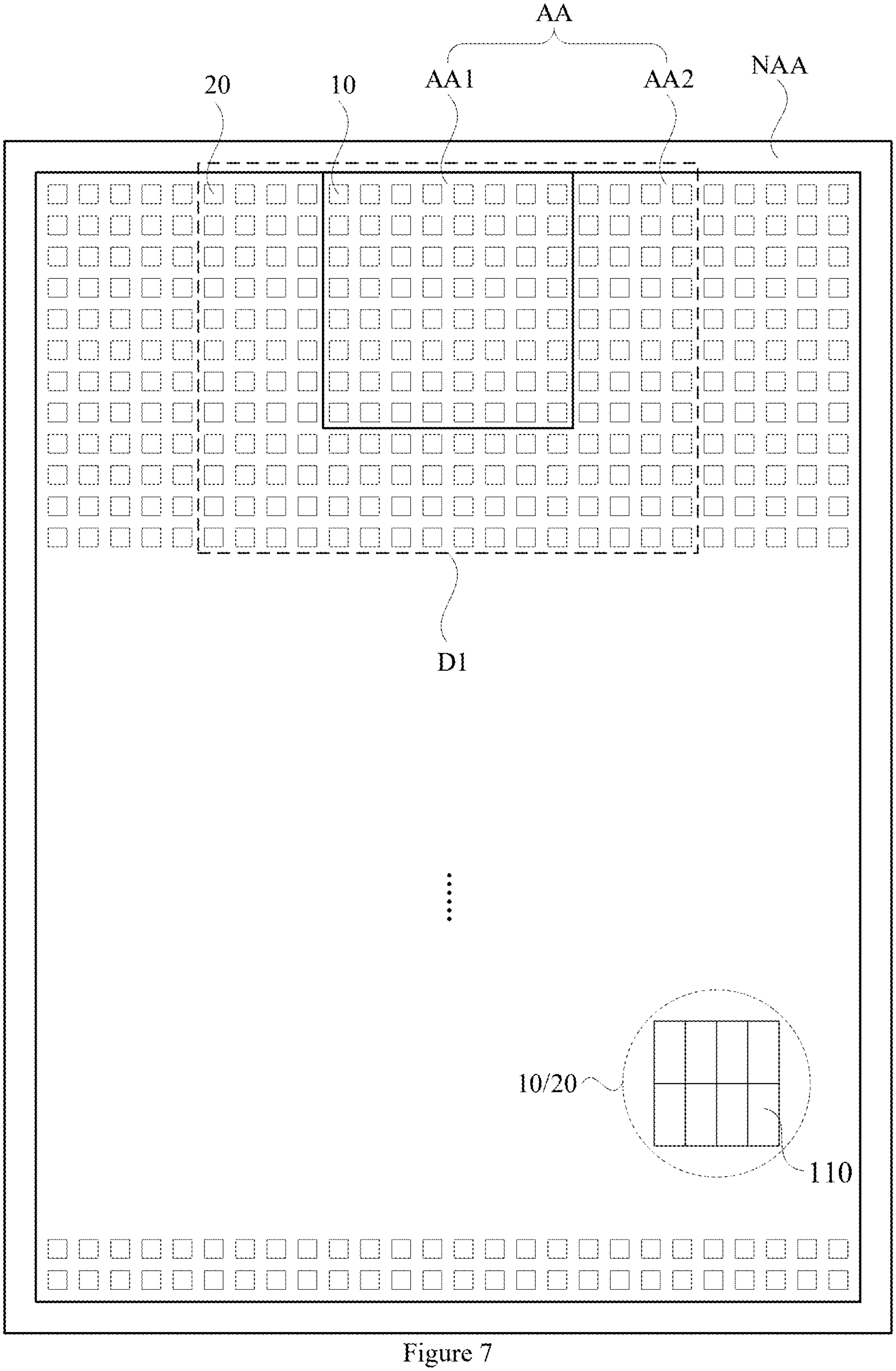
FIG. 7 is a schematic diagram of a structure of another display panel according to an embodiment of the present application.
Figure 8:
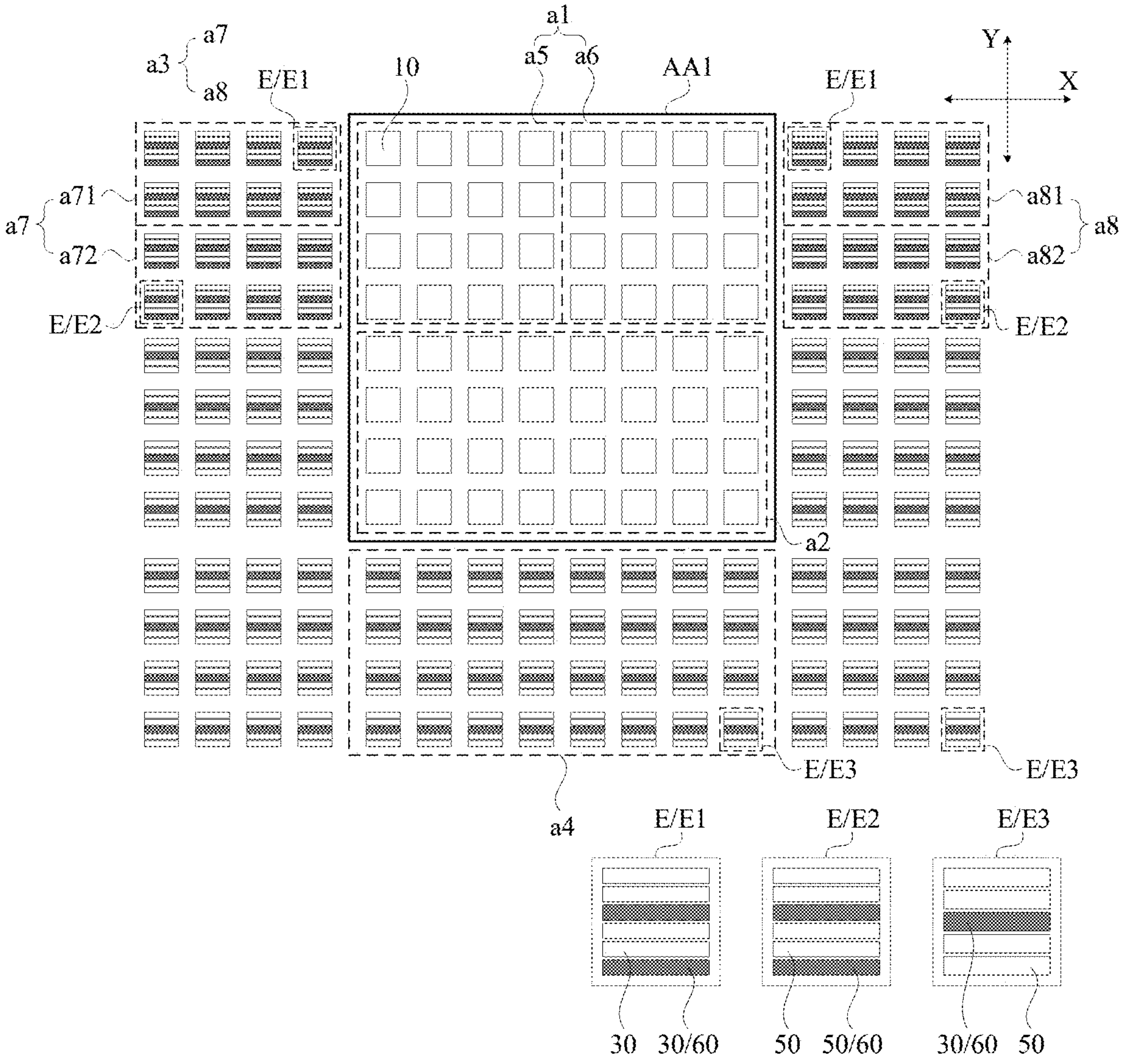
FIG. 8 is a partial enlarged view of an area D1 in FIG. 7.

FIG. 7 is a schematic diagram of a structure of another display panel according to an embodiment of the present application. FIG. 8 is a partial enlarged view of an area D1 in FIG. 7. Referring to FIG. 7 and FIG. 8, in one embodiment, on the basis of the above embodiments, at least a portion of the first pixel circuits 30 may alternatively be configured to be located between adjacent second pixel circuits 50, and at least a portion of the first pixel circuits 30 and at least a portion of the second pixel circuits 50 may be arranged in different areas in the second active area AA2.

Referring to FIG. 7 and FIG. 8, for example, the first active area AA1 includes a first active sub-area a1 and a second active sub-area a2, and the second active area AA2 includes a third active sub-area a3 and a fourth active sub-area a4. The third active sub-area a3 is adjacent to the first active sub-area a1, and the fourth active sub-area a4 is adjacent to the second active sub-area a2. The first pixel circuit 30 corresponding to the sub-pixel 110 in the first active sub-area a1 is located in the third active sub-area a3, and the first pixel circuit 30 corresponding to the sub-pixel 110 in the second active sub-area a2 is located in the fourth active sub-area a4. The first pixel circuit 30 and the second pixel circuit 50 are arranged in different areas in the third active sub-area a3, and the first pixel circuit 30 in the fourth active sub-area a4 is located between adjacent second pixel circuits 50.

For example, the first pixel circuit 30 and the second pixel circuit 50 being arranged in different areas in the third active sub-area a3 may mean an area in the third active sub-area a3 being used to arrange the first pixel circuit 30 only, and another area in the third active sub-area being used to arrange the second pixel circuit 50 corresponding to the second pixel unit 20 in the third active sub-area a3. The first pixel circuit 30 in the fourth active sub-area a4 is located between adjacent second pixel circuits 50. For example, when the display panel includes the dummy pixel circuits 60 located between adjacent second pixel circuits 50, at least a portion of the dummy pixel circuits 60 in the fourth active sub-area a4 may be reused as the first pixel circuit 30. In the embodiment, the first pixel circuit 30 and the second pixel circuit 50 are arranged in different areas in the third active sub-area a3, and the first pixel circuit 30 in the fourth active sub-area a4 is configured to be located between adjacent second pixel circuits 50, such that the first pixel circuits 30 corresponding to the plurality of sub-pixels 110 in the first active area AA1 are dispersed in a plurality of areas adjacent to the first active area AA1. This facilitates reducing the lengths of the wires connected between the first pixel circuits 30 and the corresponding sub-pixels 110.

In one embodiment, the first active sub-area a1 may be configured to include a fifth active sub-area a5 and a sixth active sub-area a6, and the third active sub-area a3 may be configured to include a seventh active sub-area a7 and an eighth active sub-area a8. The seventh active sub-area a7 is adjacent to the fifth active sub-area a5, and the eighth active sub-area a8 is adjacent to the sixth active sub-area a6. The seventh active sub-area a7 includes a first area a71 and a second area a72. The first pixel circuit 30 corresponding to the sub-pixel 110 in the fifth active sub-area a5 is located in the first area a71, and the second pixel circuit 50 corresponding to the sub-pixel 110 in the seventh active sub-area a7 is located in the second area a72. The eighth active sub-area a8 includes a third area a81 and a fourth area a82. The first pixel circuit 30 corresponding to the sub-pixel 110 in the sixth active sub-area a6 is located in the third area a81, and the second pixel circuit 50 corresponding to the sub-pixel 110 in the eighth active sub-area a8 is located in the fourth area a82.

In one embodiment, the display panel further includes dummy pixel circuits 60. At least a portion of the dummy pixel circuits 60 in the third active sub-area a3 are reused as the first pixel circuit 30 and/or the second pixel circuit 50. For example, the second active area AA2 includes a plurality of pixel circuit units E arranged in an array. For example, the first area a71 of the seventh active sub-area a7 and the third area a81 of the eighth active sub-area a8 each include a first pixel circuit unit E1, the second area a72 of the seventh active sub-area a7 and the fourth area a82 of the eighth active sub-area a8 each include a second pixel circuit unit E2, and the fourth active sub-area a4 and remaining areas of the second active area AA2 each include a third pixel circuit unit E3. The first pixel circuit unit E1 includes at least one first pixel circuit 30 and at least one dummy pixel circuit 60. For example, the first pixel circuit unit E1 includes two first pixel circuits 30, one dummy pixel circuit 60, two first pixel circuits 30, and one dummy pixel circuit 60 that are arranged sequentially. The four first pixel circuits 30 in each first pixel circuit unit E1 are respectively configured to drive sub-pixels 110 of different colors. For example, the four first pixel circuits 30 are sequentially configured to drive a red sub-pixel, a green sub-pixel, a blue sub-pixel, and a green sub-pixel. The dummy pixel circuit 60 in the first pixel circuit unit E1 may be reused as the first pixel circuit 30. The second pixel circuit unit E2 includes at least one second pixel circuit 50 and at least one dummy pixel circuit 60. For example, the second pixel circuit unit E2 includes two second pixel circuits 50, one dummy pixel circuit 60, two second pixel circuits 50, and one dummy pixel circuit 60 that are arranged sequentially. The four second pixel circuits 50 in each second pixel circuit unit E2 are respectively configured to drive sub-pixels 110 of different colors. For example, the four second pixel circuits 50 are sequentially configured to drive a red sub-pixel, a green sub-pixel, a blue sub-pixel, and a green sub-pixel. The dummy pixel circuit 60 in the second pixel circuit unit E2 may be reused as the second pixel circuit 50. The third pixel circuit unit E3 includes at least one second pixel circuit 50 and at least one dummy pixel circuit 60. For example, the third pixel circuit unit E3 includes two second pixel circuits 50, one dummy pixel circuit 60, and two second pixel circuits 50 that are arranged sequentially. The four second pixel circuits 50 in each third pixel circuit unit E3 are respectively configured to drive sub-pixels 110 of different colors. For example, the four second pixel circuits 50 are sequentially configured to drive a red sub-pixel, a green sub-pixel, a blue sub-pixel, and a green sub-pixel. The dummy pixel circuit 60 in the third pixel circuit unit E3 located in the fourth active sub-area a4 may be reused as the first pixel circuit 30.

Referring to FIG. 7 and FIG. 8, in one embodiment, the first active sub-area a1 and the second active sub-area a2 are arranged in a first direction Y, the fourth active sub-area a4 is located on one side of the second active sub-area a2 that is far away from the first active sub-area a1, the fifth active sub-area a5 and the sixth active sub-area a6 are arranged in a second direction X, the seventh active sub-area a7 and the eighth active sub-area a8 are respectively located on either sides of the first active sub-area a1, the first area a71 and the second area a72 are arranged in the first direction Y, and the third area a81 and the fourth area a82 are arranged in the first direction Y, the first direction Y being perpendicular to the second direction X.

The first direction Y may be a column direction in which the sub-pixels 110 are arranged, and the second direction X may be a row direction in which the sub-pixels 110 are arranged. For example, a description is made by using, as an example, the second active sub-area a2 being located on a lower side of the first active sub-area a1 and the fifth active sub-area a5 being located on a left side of the sixth active sub-area a6. In this case, the seventh active sub-area a7 is located on a left side of the fifth active sub-area a5, the eighth active sub-area a8 is located on a right side of the sixth active sub-area a6, and the fourth active sub-area a4 is located on a lower side of the second active sub-area a2. Such a configuration has an advantage of arranging the first pixel circuits 30 corresponding to the sub-pixels 110 in the first active area AA1 in three directions on an outer side of the first active area AA1, thereby improving the flexibility in arranging the first pixel circuits 30. Moreover, arranging the first pixel circuits 30 corresponding to the sub-pixels 110 in the first active area AA1 on a left side, a right side, and a lower side of the first active area AA1 eliminates the need to arrange the first pixel circuits 30 on an upper side of the first active area AA1, i.e., on the side of the first active area AA1 that is close to the non-active area NAA. Therefore, in the first direction Y, the area of the second active area AA2 between the upper side of the first active area AA1 and the non-active area NAA can be smaller, or the first active area AA1 may even be arranged adjacent to the non-active area NAA, which can reduce the distance between the first active area AA1 and the non-active area NAA, and then reduce the distance between an under display camera area and the non-active area NAA, thereby improving the user experience. In this case, there is no transition area at the periphery of the first active area AA1.

As an optional embodiment of the present application, the first active area AA1 may be configured to include eight rows and eight columns of first pixel units 10, the fifth active sub-area a5 may be configured to include first to fourth columns of the first to fourth rows of first pixel units 10, the sixth active sub-area a6 may be configured to include fifth to eighth columns of the first to fourth rows of first pixel units 10, and the second active sub-area a2 may be configured to include fifth to eighth rows of first pixel units 10. Correspondingly, the first pixel circuit 30 corresponding to the first pixel unit 10 in the fifth active sub-area a5 may be arranged in the first area a71 of the seventh active sub-area a7, and the second pixel circuits 50 corresponding to the four rows and four columns of second pixel units 20 in the seventh active sub-area a7 may be arranged in the second area a72 of the seventh active sub-area a7. The first pixel circuit 30 corresponding to the first pixel unit 10 in the sixth active sub-area a6 may be arranged in the third area a81 of the eighth active sub-area a8, and the second pixel circuits 50 corresponding to the four rows and four columns of second pixel units 20 in the eighth active sub-area a8 may be arranged in the fourth area a82 of the eighth active sub-area a8. The fourth active sub-area a4 may include four rows and eight columns of second pixel units 20. The second pixel circuits 50 corresponding to the second pixel units 20 in the fourth active sub-area a4 and the first pixel circuits 30 corresponding to the first pixel units 10 in the second active sub-area a2 may both be arranged in the fourth active sub-area a4.

In one embodiment, in other embodiments, it is also possible to arrange at least a portion of the first pixel circuits 30 and at least a portion of the second pixel circuits 50 in different areas in the second active area AA2, instead of arranging the first pixel circuits 30 between adjacent second pixel circuits 50. In actual application, it is possible to choose, according to requirements, whether to arrange at least a portion of the first pixel circuits 30 and at least a portion of the second pixel circuits 50 in different areas in the second active area AA2 and/or whether to arrange at least a portion of the first pixel circuits 30 between adjacent second pixel circuits 50.

Referring to FIG. 2 or FIG. 8, on the basis of the above embodiments, the first active area AA1 and the second active area AA2 may have the same or different sub-pixel densities. The sub-pixel density is the number of sub-pixels 110 per unit area of the active area (pixels per inch, PPI). The sub-pixel density of the first active area AA1 and the sub-pixel density of the second active area AA2 may be set according to requirements, which are not limited in this embodiment.

On the basis of the above embodiments, the sub-pixels in the first active area AA1 and the sub-pixels in the second active area AA2 are arranged in the same way. For example, the sub-pixels 110 of different colors in the first pixel unit 10 in the first active area AA1 may be arranged in the same way as the sub-pixels 110 of different colors in the second pixel unit 20 in the second active area AA2. For example, the arrangement of the sub-pixels in the first active area AA1 and the second active area AA2 may be the arrangement of the sub-pixels 110 of different colors shown in FIG. 3 and FIG. 4.

On the basis of the above embodiments, the first pixel circuit 30 and the second pixel circuit 50 have the same structure. Such a configuration has an advantage of improving the display consistency between the first active area AA1 and the second active area AA2, and simplifying the manufacturing process of the display panel without the need to design pixel circuits with different structures for the first active area AA1 and the second active area AA2. In addition, the first active area AA1 and the second active area AA2 may further be configured to support different gamma algorithms to respectively adjust the display effects in the first active area AA1 and the second active area AA2, thereby improving the uniformity of the overall display brightness of the display panel.

Figure 9:
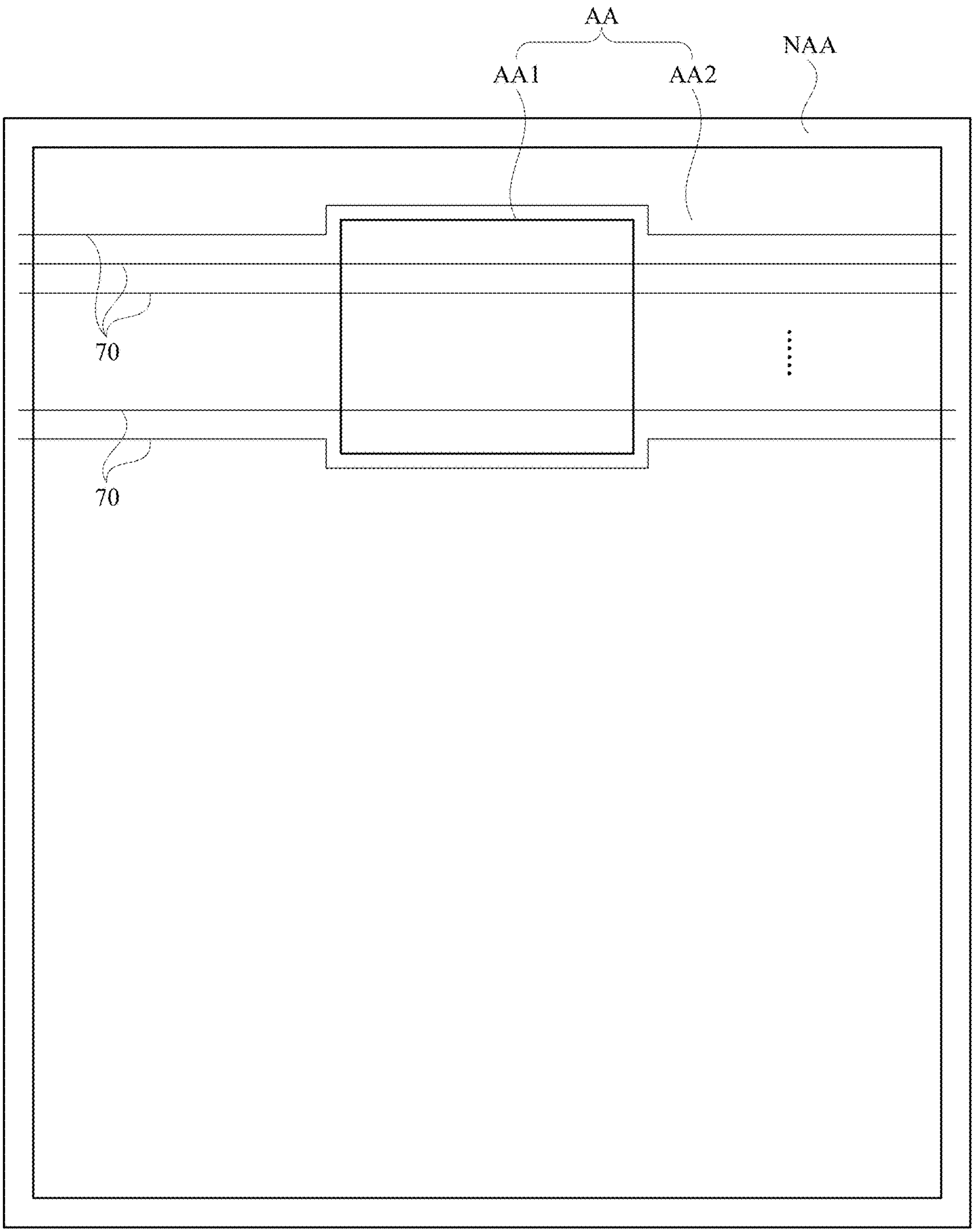
FIG. 9 is a schematic diagram of a structure of another display panel according to an embodiment of the present application.

FIG. 9 is a schematic diagram of a structure of another display panel according to an embodiment of the present application. Referring to FIG. 2 to FIG. 9, on the basis of the above embodiments, the display panel further includes scan lines 70. The first pixel circuits 30 for driving the sub-pixels 110 in the same row of first pixel units 10 are connected to the same scan line 70. For example, the first pixel circuit 30 includes a switching transistor. Each scan line 70 is connected to a gate electrode of the switching transistor in the corresponding first pixel circuit 30 to supply a scan signal to the gate electrode of the switching transistor, so as to control turning-on and turning-off of the switching transistor. The first pixel circuits 30 for driving the sub-pixels 110 in all rows of first pixel units 10 are respectively connected to the corresponding scan lines 70, and the first pixel circuits 30 for driving the sub-pixels 110 in the same row of first pixel units 10 are connected to the same scan line 70, such that row-by-row scanning of the first pixel units 10 in the first active area AA is implemented.

In one embodiment, the scan line 70 connected to the first pixel circuits 30 is located outside the first active area AA1; or the scan line 70 connected to the first pixel circuits 30 passes through the first active area AA1, and the scan line 70 located in the first active area AA1 is a transparent metal wire.

For example, when the first pixel circuits 30 corresponding to the sub-pixels 110 in the same row of first pixel units 10 are distributed on two sides of the row of first pixel units 10, the scan line 70 needs to be connected to each of the first pixel circuits 30 located on the two sides of the row of first pixel units 10. In an embodiment, the scan lines 70 may be configured to be located outside the first active area AA1. For example, the scan lines 70 may extend from a left edge of the second active area AA2 toward the first active area AA1 in the row direction in which the first pixel circuits 30 are arranged, and perform, at a position close to the first active area AA1 and at an outer edge of the first active area AA1, wire winding from one side of the first active area AA1 to the other side thereof, and then continue to extend from an edge of the first active area AA1 toward a right edge of the second active area AA2 in the row direction in which the first pixel circuits 30 are arranged, such that the scan lines 70 are arranged to be wound at an outer periphery of the first active area AA1. This avoids affecting the display effect in the first active area AA1 as a result of the scan lines 70 passing through the first active area AA1. In another embodiment, the scan lines 70 connected to the first pixel circuits 30 may be configured to pass through the first active area AA1. For example, the scan lines 70 may be configured to extend from a left edge of the second active area AA2 through the first active area AA1 toward a right edge of the second active area AA2 in the row direction in which the first pixel circuits 30 are arranged, such that the scan lines 70 are connected to the first pixel circuits 30 located on two sides of the first active area AA1. The scan lines 70 each include a portion of the scan line located in the first active area AA1. The portion of the scan line 70 is a transparent metal wire. Such a configuration has an advantage that the scan lines 70 can extend in the same direction, which facilitates simplifying the structure of the scan lines 70. Moreover, since the scan lines 70 in the first active area AA1 are transparent metal wires, the scan lines 70 in the first active area AA1 do not affect the display effect of the first active area AA1.

It should be noted that FIG. 9 shows that a portion of the scan lines 70 connected to the first pixel circuits are located outside the first active area AA1, and a portion of the scan lines 70 pass through the first active area AA1, the scan lines 70 located in the first active area AA1 being transparent metal wires. In other embodiments, all of the scan lines 70 connected to the first pixel circuits may be configured to be located outside the first active area AA1, or all of the scan lines 70 connected to the first pixel circuits may be configured to pass through the first active area AA1, the scan lines 70 located in the first active area AA1 being transparent metal wires.

It should be noted that the first active area AA1 being in the shape of a rectangle and the first active area AA1 being located near the top of the active area AA as a whole is used as an example for illustration in FIG. 2, FIG. 7, and FIG. 9. In other embodiments, the first active area AA1 is not limited to be in the shape of a rectangle, and the first active area AA1 may be in other shapes, such as a circle, a droplet, or a "U" shape, and the first active area AA1 may alternatively be arranged at other positions of the active area AA. The shape and position of the first active area AA1 are not limited in this embodiment of the present application.

An embodiment of the present application further provides a display apparatus. The display apparatus includes a display panel according to any one of the above embodiments. The display apparatus may be an apparatus with a display function, such as a mobile phone, a desktop computer, a notebook computer, or a tablet computer. The display apparatus according to the embodiments of the present application includes a display panel according to any one of the above embodiments, and thus has the corresponding functional structures of the display panel. Details are not described herein.

What is claimed is:

1. A display panel, which has a first active area and a second active area, wherein a light transmittance of the first active area is greater than a light transmittance of the second active area, the display panel comprising:

a plurality of first pixel units located in the first active area, each first pixel unit comprising a plurality of sub-pixels, wherein each sub-pixel comprises a first electrode and a second electrode opposite the first electrode;

a plurality of second pixel units located in the second active area;

a plurality of second pixel circuits located in the second active area and configured to drive the plurality of second pixel units;

a plurality of dummy pixel circuits located between adjacent second pixel circuits; and a plurality of first pixel circuits located in the second active area, each first pixel circuit being connected to the first electrode of the corresponding sub-pixel in the corresponding first pixel unit through a wire, wherein the plurality of first pixel circuits are arranged in an array, and the first pixel circuits corresponding to the plurality of sub-pixels in a same first pixel unit are arranged in at least two rows and in a number of columns less than a total number of sub-pixels in the first pixel unit; and wherein at least a portion of the plurality of first pixel circuits are located between adjacent second pixel circuits, and said at least a portion of the plurality of first pixel circuits are reused dummy pixel circuits.

2. The display panel according to claim 1, wherein the first pixel unit comprises m sub-pixels of the same color, and the m sub-pixels of the same color in the same first pixel unit are driven by n first pixel circuits, wherein n and m are both positive integers greater than or equal to 1, and $n \leq m$.

3. The display panel according to claim 2, wherein for $n=m=1$, each first pixel circuit is connected to one corresponding sub-pixel through the wire;

for n=1 and m>1, the first electrodes of the m sub-pixels of the same color in the same first pixel unit are electrically connected to each other, and are electrically connected to the corresponding first pixel circuit through a same wire; and for n>1 and m>1, n first pixel circuits corresponding to the m sub-pixels of the same color in the same first pixel unit are electrically connected to each other, and the first electrodes of the m sub-pixels of the same color are electrically connected to each other, and are electrically connected to any first pixel circuit among the n corresponding first pixel circuits through a same wire.

4. The display panel according to claim 3, wherein for n>1 and m>1, the m sub-pixels of the same color in the same first pixel unit are connected to the closest first pixel circuit among the n corresponding first pixel circuits through the wire.

5. The display panel according to claim 1, wherein at least part of the plurality of sub-pixels in the first pixel unit have different colors, and there is at least one sub-pixel of each color; and the first pixel circuits corresponding to the sub-pixels of the same color in the same first pixel unit are arranged in a same row; or the first pixel circuits corresponding to the sub-pixels of the same color in the same first pixel unit are arranged in a same column; or the first pixel circuits corresponding to the sub-pixels of the same color in the same first pixel unit are arranged in at least one of different rows and different columns.

6. The display panel according to claim 1, wherein the plurality of sub-pixels of the first pixel unit comprises a plurality of first sub-pixels, a plurality of second sub-pixels, and a plurality of third sub-pixels, the first sub-pixels, the second sub-pixels, and the third sub-pixels having different colors, and the same first pixel unit comprises two first sub-pixels and two third sub-pixels, as well as four second sub-pixels;

the first sub-pixels, the second sub-pixels, and the third sub-pixels are arranged in an array in the first pixel unit, a first sub-pixel of the first sub-pixels, a second sub-pixel of the second sub-pixels, a third sub-pixel of the third sub-pixels, and a second sub-pixel of the second sub-pixels being sequentially arranged in a first row of the first pixel unit, and a third sub-pixel of the third sub-pixels, a second sub-pixel of the second sub-pixels, a first sub-pixel of the first sub-pixels, and a second sub-pixel of the second sub-pixels being sequentially arranged in a second row of the first pixel unit; and the first sub-pixel is a red sub-pixel, the second sub-pixel is a green sub-pixel, and the third sub-pixel is a blue sub-pixel.

7. The display panel according to claim 6, wherein the first pixel circuit comprises a plurality of first sub-pixel circuits, a plurality of second sub-pixel circuits, and a plurality of third sub-pixel circuits, the two first sub-pixels in the same first pixel unit being driven by two first sub-pixel circuits, the two third sub-pixels in the same first pixel unit being driven by two third sub-pixel circuits, and the four second sub-pixels in the same first pixel unit being driven by four second sub-pixel circuits; and in the first pixel circuits corresponding to the same first pixel unit: two first sub-pixel circuits are arranged in a column, two third sub-pixel circuits are arranged in a column, four second sub-pixel circuits are arranged in two columns, and the two first sub-pixel circuits, the four second sub-pixel circuits, and the two third sub-pixel circuits are arranged in at least two rows; and the column of the two first sub-pixel circuits, the two columns of the four second sub-pixel circuits, and the column of the two third sub-pixel circuits are sequentially arranged on one side of the corresponding first pixel unit.

8. The display panel according to claim 6, wherein the first pixel circuit comprises a plurality of first sub-pixel circuits, a plurality of second sub-pixel circuits, and a plurality of third sub-pixel circuits, the two first sub-pixels in the same first pixel unit being driven by two first sub-pixel circuits, the two third sub-pixels in the same first pixel unit being driven by two third sub-pixel circuits, and the four second sub-pixels in the same first pixel unit being driven by four second sub-pixel circuits; and in the first pixel circuits corresponding to the same first pixel unit: one of the two first sub-pixel circuits and one of the two third sub-pixel circuits are arranged in a column, another one of the two first sub-pixel circuits and another one of the two third sub-pixel circuits are arranged in a column, four second sub-pixel circuits are arranged in two columns, and the two first sub-pixel circuits, the four second sub-pixel circuits, and the two third sub-pixel circuits are arranged in at least two rows; and the column of the one of the two first sub-pixel circuits and the one of the two third sub-pixel circuits, the column of the another one of the two first sub-pixel circuits and the another one of the two third sub-pixel circuits, and the two columns of the four second sub-pixel circuits are sequentially arranged on one side of the corresponding first pixel unit.

9. The display panel according to claim 1, wherein the first pixel circuits corresponding to the plurality of sub-pixels in a same first pixel unit are arranged in at least two adjacent rows.

10. The display panel according to claim 1, wherein the first active area comprises at least one row of first pixel units, and the first pixel circuits corresponding to the sub-pixels in the same row of first pixel units occupy the same row.

11. The display panel according to claim 10, wherein the first pixel circuits corresponding to the sub-pixels in the same row of first pixel units are distributed on two sides of the row of first pixel units.

12. The display panel according to claim 1, wherein the wire is a transparent metal wire; and a material of the wire comprises at least one of indium tin oxide and indium zinc oxide.

13. The display panel according to claim 1, further comprising a plurality of scan lines, wherein the first pixel circuits for driving the sub-pixels in the same row of first pixel units are connected to a same scan line.

14. The display panel according to claim 13, wherein the scan line connected to the first pixel circuits is located outside the first active area; or the scan line connected to the first pixel circuits passes through the first active area, and at least part of the scan line located in the first active area is a transparent metal wire.

15. The display panel according to claim 1, wherein the first active area comprises a first active sub-area and a second active sub-area, and the second active area comprises a third active sub-area and a fourth active sub-area, the third active sub-area being adjacent to the first active sub-area, and the fourth active sub-area being adjacent to the second active sub-area;

the first pixel circuit corresponding to the sub-pixel in the first active sub-area is located in the third active sub-area, and the first pixel circuit corresponding to the sub-pixel in the second active sub-area is located in the fourth active sub-area; and the first pixel circuit and the second pixel circuit are arranged in different areas in the third active sub-area, and the first pixel circuit in the fourth active sub-area is located between adjacent second pixel circuits.

16. The display panel according to claim 15, wherein the first active sub-area comprises a fifth active sub-area and a sixth active sub-area, and the third active sub-area comprises a seventh active sub-area and an eighth active sub-area, the seventh active sub-area being adjacent to the fifth active sub-area, and the eighth active sub-area being adjacent to the sixth active sub-area;

the seventh active sub-area comprises a first area and a second area, the first pixel circuit corresponding to the sub-pixel in the fifth active sub-area being located in the first area, and the second pixel circuit corresponding to the sub-pixel in the seventh active sub-area being located in the second area;

the eighth active sub-area comprises a third area and a fourth area, the first pixel circuit corresponding to the sub-pixel in the sixth active sub-area being located in the third area, and the second pixel circuit corresponding to the sub-pixel in the eighth active sub-area being located in the fourth area;

the display panel further comprises dummy pixel circuits, wherein at least a portion of the dummy pixel circuits in the third active sub-area are reused as at least one of the first pixel circuit and the second pixel circuit;

at least a portion of the dummy pixel circuits in the fourth active sub-area are reused as the first pixel circuit; and the first active sub-area and the second active sub-area are arranged in a first direction, the fourth active sub-area is located on one side of the second active sub-area that is far away from the first active sub-area, the fifth active sub-area and the sixth active sub-area are arranged in a second direction, the seventh active sub-area and the eighth active sub-area are respectively located on either sides of the first active sub-area, the first area and the second area are arranged in the first direction, and the third area and the fourth area are arranged in the first direction, the first direction being perpendicular to the second direction.

17. A display apparatus, comprising:

a display panel, which has a first active area and a second active area, wherein a light transmittance of the first active area is greater than a light transmittance of the second active area, the display panel comprising:

a plurality of first pixel units located in the first active area, each first pixel unit comprising a plurality of sub-pixels, wherein each sub-pixel comprises a first electrode and a second electrode opposite the first electrode;

a plurality of second pixel units located in the second active area;

a plurality of second pixel circuits located in the second active area and configured to drive the plurality of second pixel units;

a plurality of dummy pixel circuits located between adjacent second pixel circuits; and a plurality of first pixel circuits located in the second active area, each first pixel circuit being connected to the first electrode of the corresponding sub-pixel in the corresponding first pixel unit through a wire, wherein the plurality of first pixel circuits are arranged in an array, and the first pixel circuits corresponding to the plurality of sub-pixels in a same first pixel unit are arranged in at least two rows and in a number of columns less than a total number of sub-pixels in the first pixel unit; and wherein at least a portion of the plurality of first pixel circuits are located between adjacent second pixel circuits, and said at least a portion of the plurality of first pixel circuits are reused dummy pixel circuits.

* * * * *